Nov. 19, 1963     H. MEMBRINO     3,111,063
CONTAINER FORMING MECHANISM AND PROCESS
Filed Sept. 17, 1962     2 Sheets-Sheet 1
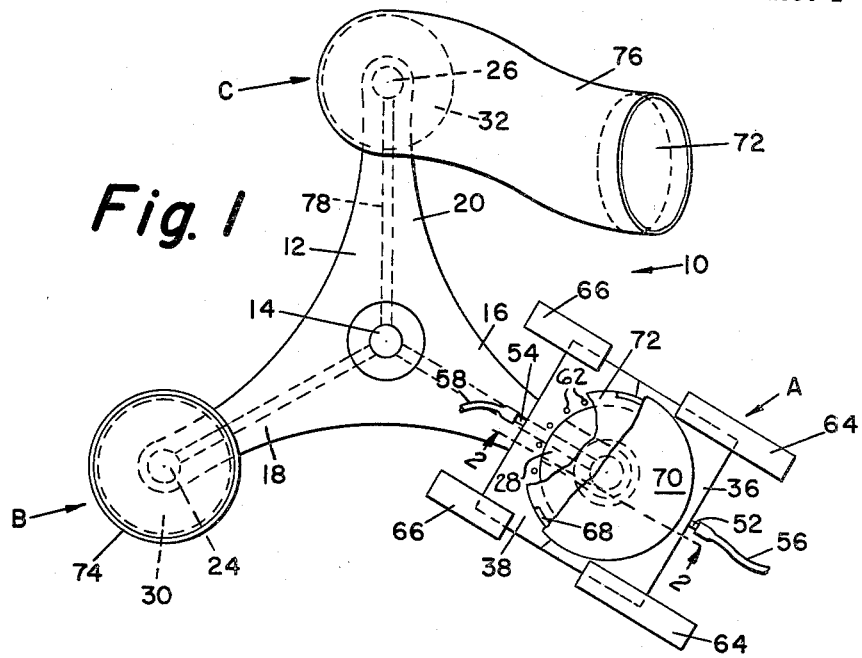
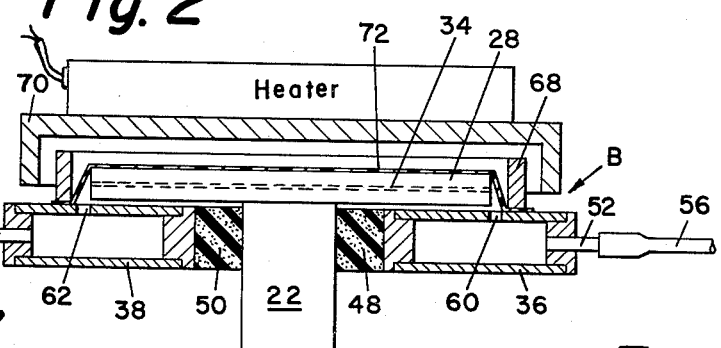
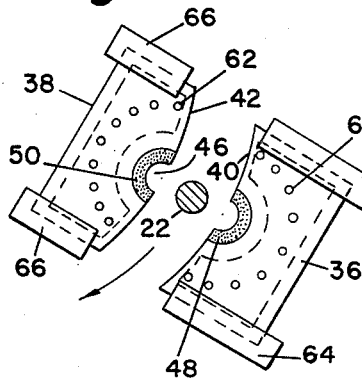
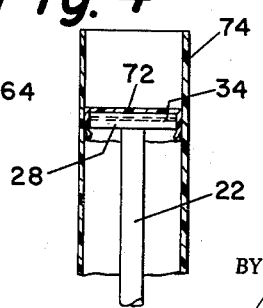
INVENTOR.
HERMAN MEMBRINO
BY
ATTORNEY Nov. 19, 1963          H. MEMBRINO          3,111,063
CONTAINER FORMING MECHANISM AND PROCESS
Filed Sept. 17, 1962          2 Sheets-Sheet 2
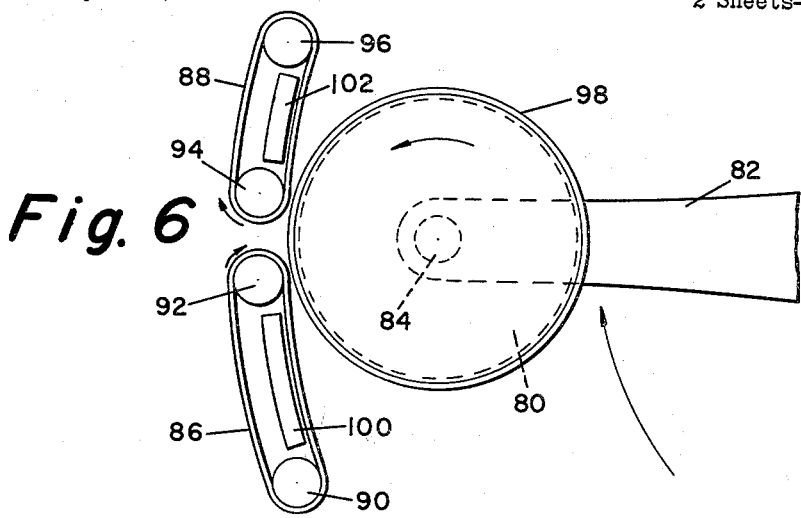
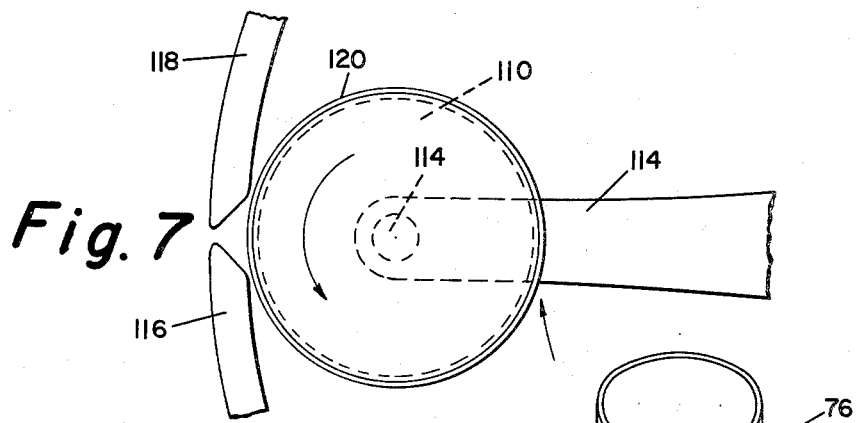
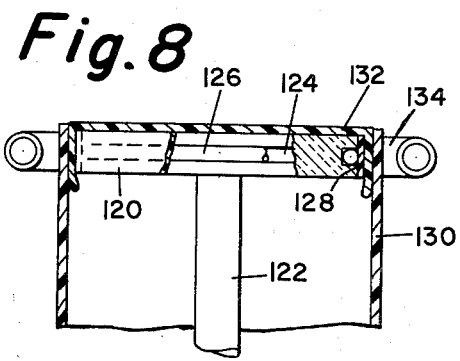
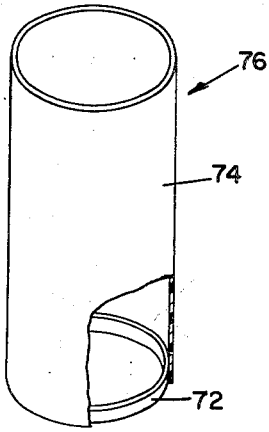
INVENTOR.
HERMAN MEMBRINO
BY
ATTORNEY

United States Patent Office 3,111,063
Patented Nov. 19, 1963

3,111,063
CONTAINER FORMING MECHANISM AND PROCESS
Herman Membrino, 10th and Chestnut Sts., Chester, Pa.
Filed Sept. 17, 1962, Ser. No. 224,023
14 Claims. (Cl. 93—8)

This invention relates to flexible containers made of polymeric material or the like, and it particularly relates to a novel method and mechanism for producing such containers.

Flexible containers, made of various polyolefins or similar materials, are gaining increasing acceptance in the shipping and storage of liquids and powders, especially those which are chemically reactive with the ordinary types of containers. These polymeric containers may be utilized either by themselves or as liners for more rigid containers or drums constructed of such materials as steel, cardboard, wood, etc.

Although flexible containers of the aforesaid type have been heretofore produced, many prior type containers did not stand up in use because their seams tended to rupture under the pressure of the contents. This was especially true as regards those seams formed between abutting portions of the material, these abutting portions being under peeling stress whereby they were adapted to be pulled apart. Other prior containers were constructed with overlapping edges at the seam whereby the seam was subject to shear stress when under load, and these overlapping type seams did overcome the difficulty inherent in the peeling stress type seams. However, the methods for forming the containers with overlapping or shear stress type seams were often time consuming and not as efficient as they should have been for most effective mass production operations.

It is therefore one object of the present invention to overcome the defects and disadvantages of the prior art by providing a process and mechanism for producing flexible containers with overlapping seams in a more efficient manner than was heretofore possible.

Another object of the present invention is to provide a process of the aforesaid type which requires a minimum of expensive machinery and a minimum of skilled and expensive labor.

Other objects and many of the attendant advantages of this invention will be readily appreciated as the same becomes better understood by reference to the following description when read in conjunction with the accompanying drawings wherein:

FIG. 1 is a top plan view of a mechanism embodying the present invention.

FIG. 2 is a cross-sectional view taken on line 2—2 of FIG. 1.

FIG. 3 is a top plan view of the suction assembly of FIG. 1 in open position.

FIG. 4 is a fragmentary sectional view showing a tubular casing in the process of being pulled over the end closure means on one of the mandrels.

FIG. 5 is a fragmentary sectional view, similar to but somewhat enlarged relative to FIG. 4, showing the end closure means in position at one end of the tubular casing.

FIG. 6 is a fragmentary top plan view of a modified mechanism embodying the present invention.

FIG. 7 is a view similar to FIG. 6 but showing a third embodiment of the invention.

FIG. 8 is a fragmentary, sectional view, partly broken away, illustrating yet another form of the present invention.

FIG. 9 is a perspective view, partly broken away, of a container produced by the present invention.

Referring now in greater detail to the various figures of the drawings wherein similar reference characters refer to similar parts, there is shown a mechanism, generally designated 10, comprising a turret 12 mounted for rotation on a shaft 14. The turret is rotated in step-by-step, timed, intermittent motion the means for accomplishing this not being shown since any one of various standard timed drive means would be sufficient for this purpose.

The turret 12 is provided with a plurality of radial arms here shown as being three in number and comprising arms 16, 18, and 20. Each of these arms is provided at its outer end with a vertical shaft or spindle, designated respectively as 22, 24 and 26, which are rotatable within their bearings formed in their corresponding arms. Mounted on each spindle is a head or mandrel, respectively designated as 28, 30 and 32. The mandrels are each constructed of electrically non-conductive material and around the periphery thereof extends a double strand of "Teflon"-coated resistance wire or ribbon 34, which is connected to a source of electrical energy (not shown). This resistance element is preferably constructed of "Nichrome" (an alloy containing 60% nickel, 24% iron, 16% chromium and 0.1% carbon, manufactured by Driver-Harris Co., Harrison, N.J.), although other electrical resistance elements may be used. The "Teflon" covering is used to prevent sticking after the thermoplastic material has become plasticized.

The arms of the turret rotatively move into position at three different stations, respectively designated A, B and C. At station A, the end closure member is formed, at station B, the tubular casing is fitted with the end closure member and at station C, the completed container is removed and a new blank for forming the end closure member is positioned on the mandrel.

The mechanism at station A comprises a pair of relatively movable suction chambers 36 and 38. These suction chambers are horizontally movable toward and away from each other into and out of the closed position. They have complementary inner edges, indicated respectively at 40 and 42 (see FIG. 3). As shown, these edges are arcuate in a curvature corresponding to the arcuate travel of the turret, thereby utilizing the least amount of space in their movement into and out of closed position. However, these edges may also be made straight, if so desired.

At the central portion of each edge 40 and 42 is provided a semi-circular recess, as at 44 and 46 respectively, each recess being defined by an arcuate cushion of resilient material, these cushions being designated respectively 48 and 50. The recesses 44 and 46 are of a size and shape to closely embrace the spindle 22 when the chambers 36 and 38 are in closed position. Resilient sealing collars 48 and 50 coact to form a seal around the spindle when the chambers are closed together and, if desired, resilient sealing strips may also be provided along the mating edges of the chambers throughout their length.

Inlet lines 52 and 54 are provided for the respective chambers 36 and 38 and each inlet is connected to a source of suction (not shown) as by respective flexible hoses 56 and 58. The upper walls of each chamber are provided with arcuate series of spaced openings, as at 60 and 62, these openings being in communication with the interiors of their respective chambers and being so arranged that when the chambers are closed together the openings form a circle just outside the outer circumference of the mandrel.

The chambers 36 and 38 are horizontally movable into and out of closed position along tracks or channels respectively designated 64 and 66. The tracks are supported in any manner desired and the chambers may be moved either manually or by any standard mechanism operatively connected to the drive means for the turret for timed actuation thereof.

Also at station A are provided a vertically movable clamping ring or collar 68 and a vertically movable heating means 70. The heating means may be electrical or any other desired type. The actual structures for moving the clamping ring and heating means into and out of position are not shown since they can comprise any standard means such as an arm connected by a linkage or the like to the drive means. Whatever structure is used, however, and this may include purely manual means for moving the clamping ring and heating means, first the clamping ring and then the heating means are lowered into the operative position (as in FIG. 2) and then withdrawn in reverse order.

In the operation of the device, with the mandrel 28 at station A, a disc or sheet 72 of thermoplastic polymeric material, such as polyethylene, is placed over the mandrel, the disc being of a size sufficient to permit its edge portion to substantially overlap the periphery of the mandrel. The suction chambers are then closed around the spindle 22, the clamping ring is lowered to clamp the overlapped peripheral portion of the polymeric material against the upper face of the chambers and, finally, the heating means is brought down over the ring and the heating cycle is begun. This is the position of the parts in FIG. 2. In this position, suction is applied in the chambers, this suction being applied around the periphery of the mandrel within the area encompassed by the clamped peripheral portion of the polymeric sheet 72. The suction acts to pull the sheet 72 down around the mandrel while the sheet is being softened by the heat so that the sheet assumes a definite dish-like shape in accordance with the shape of the mandrel. Thereafter, after a proper interval, the heater and clamping means are removed and the suction chambers are moved to the open position. The turret then rotates to move the mandrel, with the formed thermoplastic sheet thereon, to station B.

At station B, the container is formed by joining the formed sheet 72, which is to serve as the end closure means, to a tubular thermoplastic casing 74 which is to serve as the body of the container. This is accomplished by pulling the casing 74, of a diameter to fit snugly around the mandrel 28, down over the mandrel until the upper end of the casing is flush with the blank 72. The intermediate step of pulling the casing down over the mandrel is illustrated in FIG. 4 and its final position is shown in FIG. 5. As will be noted in both of these latter figures, the tight fit of the casing causes the peripheral portion of the blank 72, which had been pressed horizontal by the clamping ring 68, to assume a vertical position in close adjacency to the inner surface of the casing. The electrical circuit to the resistance wire 34 is then energized and the heat generated thereby fuses the peripheral wall of the blank to the casing in a linear seal. The circuit is then deenergized and the turret is rotated to bring the completed container to station C. When it reaches station C, the sealed joint is cool and set and the completed container, designated 76, is removed from the mandrel by either pulling it off, as shown in FIG. 1, or blowing it off. The blowing off of the casing may be effected by making the spindles 22, 24 and 26 hollow and connecting them by respective conduits 78 to the shaft 14 which is also hollow and is connected to a source of air pressure (not shown) which is actuatable either manually or by any standard mechanism operatively connected to the turret drive means for timed operation therewith. This procedure not only serves to effectively remove the completed container but also serves as a test to determine whether the container is free of air holes.

While the end closure member is being formed at station A, the casing is applied and joined to the end closure at station B and the completed container is removed and replaced by a fresh blank 72 at station C.

In FIG. 6 there is shown a modification of the mechanism described above wherein the entire operation remains the same except that which takes place at station B. In this embodiment, the mandrel 80, which is supported on turret arm 82, is similar to the mandrels 28, 30 and 32 except that the resistance wire 34 is omitted. In addition, the spindle 84, on which mandrel 80 is mounted, is adapted to be rotated as it approaches station B. This can be accomplished by any desired standard means such as, for example, by providing a gear or pinion on spindle 84 which meshes with an arcuate rack on the mechanism below the turret, or with a driven gear, etc.

Adjacent the arcuate path of movement of the mandrel 80, as it rotates with the turret into and out of station B, are a pair of endless steel bands 86 and 88 which rotate around their respective pulleys 90 and 92 for band 86 and 94 and 96 for band 88. Either pulley for each band may be the driving pulley and is connected to a drive means (not shown). The pulleys 92 and 94 are in tangency to the rim of the mandrel 80 and are arranged to press upon the side wall of casing 98 (similar to casing 74) at that position. The band 86, in its travel around its pulley system, encompasses a heating means 100 which applies heat thereto just prior to being pressed against the casing 98 by pulley 92. The band 88 encompasses a cooling means 102 just prior to being pressed against casing 98 by pulley 94. At the same time, the mandrel 80 is rotating on the axis of its spindle 84. The effect of this operation is to fuse the casing to the end cover by means of the heated pressure of band 86 and to immediately thereafter harden and set the seam with a rapid cooling action under pressure by means of cooled band 88. The result is a firm, strong seam which is completely set prior to the movement of the mandrel to station C.

In FIG. 7 there is illustrated a modification very similar to that of FIG. 6 in that the mandrel 110 is mounted on a rotatable spindle 112 supported by a turret arm 114. However, in place of the endless bands 100 and 102 there are provided stationary, arcuate "Teflon"-coated abutment plates 116 and 118, the former being heated and the latter being cooled. The plates 116 and 118 are thin to provide a line seal on the casing 120 positioned on the mandrel 110. The proper relative movement between the casing and the plates 116 and 118, in the form of a rolling action, is provided by the rotation of the mandrel 110 on the axis of spindle 114.

In FIG. 8 there is shown a modification wherein the seal between the casing and end cover is formed at station B by means of an induction-generated heat. In this embodiment, the mandrel 120, similar to the mandrels 28, 30 and 32, is mounted on a spindle 122 supported at the end of a turret arm. The mandrel 120 is provided with an external peripheral groove 124 and positioned in this groove is a resistance wire 126. The periphery of the mandrel over the wire 126 is covered by a strip of "Teflon" or the like designated 128. In the joining step, after the casing 130 has been pulled down over the end closure 132 on the mandrel (as in FIG. 8), an induction coil 134 is applied over the parts in concentric relation to the wire 124 and the induced heat in the wire 124 causes fusion of the plastic material to take place resulting in a seam.

It is also within the scope of the present invention to substitute a fixed heating chamber or tunnel for the movable heating means 70 whereby, when the mandrel moves to station A, it enters the fixed heating chamber in which are positioned the movable clamping ring or collar 68 and the movable suction chambers 36 and 38. Then, after the end closure is formed, the mandrel moves out of the tunnel as it moves toward station B.

Although this invention has been illustrated in connection with the formation of flexible containers, it is to be understood that it can equally as well be used to form substantially rigid containers whereby the tubular casing and end closure member are constructed of substantially rigid material. It is also possible to construct either one of rigid material while the other is flexible. In addition, the end closure member may be inserted with its face either flush with the end of the casing (as shown) or with its face inwardly of the end of the casing whereby a false bottom is obtained.

It is also within the scope of this invention to preform the end closure member in any manner desired and then join this pre-formed member to the tubular casing in any of the manners disclosed herein and illustrated in FIGS. 4 to 8.

Another variation of the present invention may be accomplished by substituting a series of rollers for the endless band assemblies shown in FIG. 6. Such rollers can either be divided into heated and cooled rollers similar to the endless bands of FIG. 6 or they can be just pressure belts and the heat can be obtained from internal heating such as provided in the mechanism of FIG. 5. In the same respect, the endless bands of FIG. 6 can, themselves, be used only as pressure belts with the heating and cooling mechanisms removed. In such case, the heat of fusion can also be obtained from internal heating as in the mechanism of FIG. 5.

Obviously many modifications and variations of the present invention are possible in the light of the above teachings. It is, therefore, to be understood that within the scope of the appended claims, the invention may be practiced otherwise than as specifically described.

The invention claimed is:

1. Mechanism for forming a container comprising a mandrel, means for forming an end closure member for the container on said mandrel and means for connecting said end closure member to a container casing, said means for forming the end closure member comprising a clamping collar constructed to surround said mandrel in spaced relation thereto, said clamping collar being movable into and out of surrounding relationship to said mandrel and, when in said surrounding relationship, being positioned to clampingly hold the peripheral portion of an overlapping sheet on said mandrel to form an annular recess between the periphery of the mandrel and the clamped portion of the sheet, a suction means adjacent the mandrel, said suction means having suction openings in communication with said annular recess, and a heating means for applying heat to the sheet on the mandrel in conjunction with the application of suction by said suction means whereby when the sheet is a thermoplastic material, the heat and the pressure of the suction act to form the sheet into a generally dish-shaped end closure member, and said means for connecting said end closure member to the container casing comprising a heating member constructed and arranged to apply fusible heat in a substantially linear pattern to a junction between said end closure member and the container casing while the end closure member is on the mandrel and after the casing has been applied over the end closure member and is therefore also positioned on the mandrel.

2. The mechanism of claim 1 wherein the heating member for applying the fusible heat comprises an electrical resistance wire encircling the periphery of the mandrel and operatively connected to a source of electrical energy.

3. The mechanism of claim 1 wherein the heating member for applying the fusible heat comprises an endless band assembly in tangency to the periphery of the mandrel, said endless band assembly including movable band means movable in tangency to the periphery of the mandrel to apply first heated pressure and then cooling pressure.

4. The mechanism of claim 1 wherein the heating member for applying the fusible heat comprises a heating plate in coacting arrangement with a cooling plate, both plates having operative portions in tangency to the periphery of the mandrel, and means for providing relative movement between the periphery of the mandrel and the plates to effect first a heating and then a cooling effect on the periphery of the mandrel.

5. The mechanism of claim 1 wherein the heating member for applying the fusible heat comprises a resistance element on the periphery of the mandrel and an induction coil coacting therewith.

6. The mechanism of claim 1 wherein said suction means comprises a plurality of suction chambers movable into and out of closed position relative to the mandrel, and wherein the clamping collar is movable into and out of operative position relative to the mandrel.

7. Mechanism for forming a container comprising a rotatable turret having a plurality of mandrels thereon, said mandrels being movable by said turret into and out of a plurality of stations, the first of said stations having means thereat for forming an end closure member from thermoplastic material while held on a mandrel, and a second station being arranged for connection of said end closure member to a container casing of thermoplastic material, said means at said first station comprising a heating means, a clamping collar and a suction means, said clamping collar being movable into and out of spaced surrounding relationship to a mandrel in which it is positioned to clampingly retain an overlapped peripheral portion of a sheet held on the mandrel, and said suction means comprising a pair of suction chambers movable into and out of closed position relative to the mandrel, said suction chambers having suction ports in communication with the area between said clamping collar and the periphery of the mandrel when the suction chambers are in said closed position.

8. The mechanism of claim 7 wherein a third station is provided for removal of a completed container and application to the mandrels of fresh blanks for forming the end closure members.

9. The mechanism of claim 7 wherein said mandrels each include a supporting spindle and wherein said suction chambers are provided with resilient cushion elements constructed and arranged to sealingly embrace the spindle of the corresponding mandrel when said suction chambers are in closed position.

10. A method of forming containers which comprises applying an end closure member having a closure surface and a peripheral wall surrounding said closure surface over a mandrel with the closure surface overlying the corresponding surface of the mandrel and the peripheral wall overlapping the periphery of the mandrel, retaining the mandrel with said end closure member thereon in a stationary position while applying a hollow, flexible, open-ended thermoplastic casing thereover, said casing having a cross-sectional dimension to snugly fit the periphery of said mandrel and said casing being applied by first applying one end thereof over said mandrel with the end closure thereon and then drawing said casing down over said mandrel and end closure member until the opposite end of said casing is substantially flush with the closure surface of said end closure member and the peripheral wall of said end closure member is pressed between the periphery of the mandrel and the inner surface of the casing and extends toward the said one end of the casing, and then heat sealing a line seal between the peripheral wall of said end closure member and the adjacent portion of said casing in surrounding relation thereto.

11. The method of claim 10 wherein the line seal is applied internally of the end closure member.

12. The method of claim 10 wherein the line seal is applied externally of the casing.

13. The method of claim 10 wherein heat and pressure are applied to form the line seal.

14. The method of claim 10 wherein the line seal is formed by induction heating.

References Cited in the file of this patent

UNITED STATES PATENTS

| | | |
|---|---|---|
| 1,962,213 | Reed | June 12, 1934 |
| 2,259,256 | Maas et al. | Oct. 14, 1941 |
| 2,678,591 | Fleming et al. | May 18, 1954 |
| 2,783,500 | Lazarr | Mar. 5, 1957 |
| 2,910,728 | Rowe | Nov. 3, 1959 |